July 15, 1958

G. F. CALLAHAN 2,843,542

METHOD AND APPARATUS FOR PRODUCING
IMPROVED ABRADING CONTOURS

Filed Feb. 23, 1956

INVENTOR.
GEORGE F. CALLAHAN
BY Richard von K. Bruns
Attorney

July 15, 1958

G. F. CALLAHAN 2,843,542

METHOD AND APPARATUS FOR PRODUCING
IMPROVED ABRADING CONTOURS

Filed Feb. 23, 1956

INVENTOR.
GEORGE F. CALLAHAN
BY Richard von K. Bruns
Attorney

United States Patent Office 2,843,542
Patented July 15, 1958

2,843,542

METHOD AND APPARATUS FOR PRODUCING IMPROVED ABRADING CONTOURS

George F. Callahan, Nashville, Tenn.

Application February 23, 1956, Serial No. 567,358

8 Claims. (Cl. 204—192)

This invention relates generally to cutting edges and wear resistant work surfaces, and has particular reference to a method and apparatus for producing improved abrading contours on cutting tools and wear resistant machine parts by means of a controlled electrical gaseous discharge operation. As used hereinafter, the term "tool" is intended to include both a cutting tool and a wear resistant machine part. The term "abrading contours" as used herein is intended to mean the operating edges or surfaces of narrow wedge knife-like cutters, wide wedge machine tool cutters, wear resistant machine parts, and the like.

At the present time, the cutting edges or work surfaces of tools of various types are usually made of hard, infrangible material when extremely sharp and wear resistant properties are desired. This applies to the wide wedged bodies of machine tools, the narrow wedged bodies of razor blades and the like, and also to the work surfaces of wear or abrasion resistant articles such as wire guides, micrometer anvils and spindle faces, etc. When edges or surfaces harder than case hardened or treated tool steels are designed, cemented metal carbides are often used, the carbide insert being brazed or welded to the metal tool shank or block. However, most carbides and like infrangible materials are very brittle, and it is both difficult and expensive to fabricate them into a finished product with precise dimensions. This is true in manufacturing articles either on an individual or on a mass production basis.

In order to provide cutting edges and work surfaces that are harder and more durable than case hardened or treated tool steels, and at the same time can be more easily and efficiently produced than tools having carbide inserts, the present invention utilizes a controlled gaseous discharge to coat the cutting edge or work surface of a metal tool or machine part with an extremely hard or infrangible material and then to shape the deposited infrangible material to the desired contour and dimensions. Brifly stated, this method of producing improved abrading contours contemplates as a first step the heating of the tool or part to the necessary deposition temperature by means of a positive ion bombardment of a gaseous discharge. A vapor deposition operation is then utilized for coating the infrangible material on the cutting edge or work surface, and a positive ion bombardment of a gaseous discharge is thereafter utilized to sputter the deposited infrangible material to the desired final contour. In most cases, the tool or part is initially pre-formed to approximately the desired contour and dimensions in order to reduce the amount of material that must be deposited by vapor deposition and removed by the sputtering.

With the foregoing and other considerations in view, the primary object of the invention therefore is to provide an economical method and apparatus for producing keen and durable cutting edges and wear resistant surfaces by means of a gaseous discharge operation.

Another important object of the invention is to provide a method and apparatus for producing improved abrading contours on cutting tools and wear resistant machine parts, which method and apparatus lend themselves to efficient mass production operations.

A further important object of the invention is to provide a method and apparatus for producing improved abrading contours on cutting tools and wear resistant machine parts wherein materials having superior abrading qualities are utilized in combination with materials having resilient strength qualities to obtain the desired characteristics.

A still further object of the invention is to provide a method and apparatus for producing improved abrading contours on cutting tools and wear resistant machine parts wherein the conformation of the abrading contours can be controlled to precise dimensions.

Another important object of the invention is to provide a method and apparatus for producing improved abrading contours on cutting tools and wear resistant machine parts which facilitates the production of intricately contoured articles of hard material which are difficult to fabricate by other methods.

Still another object of the invention is to provide a method and apparatus for producing precise and intricate contours of infrangible materials which may be readily reprocessed to compensate for wear, or for errors in previous manufacturing.

Other objects and advantages of the invention will become apparent from the following detailed description thereof read in conjunction with the accompanying drawings which illustrate preferred embodiments of the invention for the purpose of disclosure.

Figure 2:
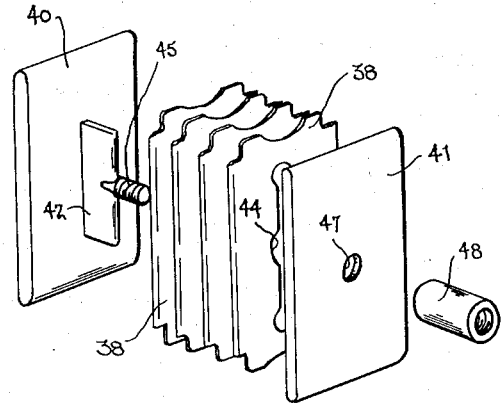
Figure 2 is an exploded perspective view of the work piece holder or clamp shown in Figure 1.

In carrying out the method of the present invention, the cutting tools or machine parts, hereinafter referred to as the work pieces, are first covered with electrical insulating material except for the edges or surfaces to be treated. The work pieces are next heated to the necessary deposition temperature by the positive ion bombardment of a gaseous discharge, and the vapor deposition of the infrangible material on the actuation area of the work pieces is then carried out. Following the vapor deposition step, the deposited infrangible material is partially sputtered away to obtain the desired final abrading contour by means of further positive ion bombardment of a gaseous discharge. As pointed out hereinbefore, the actuation area of the work pieces may be pre-formed to approximately the desired contour and dimensions before being subjected to the above steps. The term "actuation area" as used herein refers to that portion of the edge or surface area of the metal work piece which is subjected to positive ion bombardment in the vapor deposition step and in the sputtering step. The term "gaseous discharge" as used herein is intended to mean an electrical gaseous discharge, or glow discharge.

The gaseous discharges which are used for the method outlined above are the self-sustained types of cold cathode discharge which are characterized by a large internal voltage drop at the cathode and a relatively small voltage drop at the anode. The gas and vapor pressure is generally less than one atmosphere but may vary over a wide range of from 0.0001 to 100 mm. of mercury, and the cathode electrode is kept cold enough to avoid appreciable thermionic emission. In describing the invention, the terms "voltage drop," "discharge voltage," and "sputtering voltage" mean either the total voltage drop (anode to cathode) or the so-called cathode fall as they are of substantially the same magnitude.

In utilizing the gaseous discharge phenomena, it is preferable to operate under abnormal cathode fall conditions for both the vapor deposition and sputtering steps in order to accelerate the action and to better control the operation. The metal work pieces serve as the cathode electrode of the gaseous discharge in both of these steps. The entire surface area of the cathode electrode except the actuation area is covered with electrical insulating material to protect it from positive ion bombardment and to confine the latter to the actuation area.

As will be explained in more detail hereinafter, A. C. as well as D. C. supply voltages may be used. When A. C. is used, the work piece or pieces serve as an anode as well as cathode in accordance with the reversals of the supply voltage polarity. However, since the beneficial action occurs only when the work piece is the negative cathode, it will be referred to only as such hereinafter although it should be understood that either A. C. or D. C. supply voltage may be used.

As noted hereinabove, the principal function of the positive ion bombardment preceding the vapor deposition step is to heat the actuation area of the cathode work pieces to a temperature suitable for vapor deposition. It is generally desirable to heat this area to a fairly uniform temperature as the temperature is an important factor in the quality as well as the rate of deposition. Although an arc discharge can also be used to heat the actuation area, it has been found desirable to avoid such a discharge because the resultant "hot spot" heating of the arc makes it difficult to control the vapor deposition and obtain uniform results.

The principal function of the positive ion bombardment of the sputtering step is to sputter or erode the deposition coated actuation area of the work pieces to form the desired contour of the deposited infrangible material. There are many factors in expediting the sputtering action, and one of the most important of these is to control the gaseous discharge conditions so as to obtain a large input of bombardment energy. However, because the voltage is a much more important factor in speeding up the sputtering action than the current, it is desirable to use relatively low gas or vapor pressure and to operate primarily in the abnormal cathode fall region of the discharge. In operating primarily in the abnormal cathode fall region, precaution must be taken to avoid conversion to an arc discharge which is generally quite destructive. This is accomplished by suitable arrangement of the cathode electrode to give a fairly uniform temperature over the actuation area with no hot spots to provide thermionic emission.

As will be explained in more detail as the description proceeds, a higher gas pressure is maintained in the vapor deposition step than in the sputtering step although the discharge voltage is lower. There is some sputtering of the actuation area during the vapor desposition step, but the higher gas pressure and lower discharge voltage make the amount of material sputtered insignificant compared with the amount of material deposited. The same apparatus can normally be used for the pre-heating, vapor deposition and sputtering steps, it being necessary only to change the gas and vapor pressures and voltages which can be done by means of simple external controls.

Figure 1:
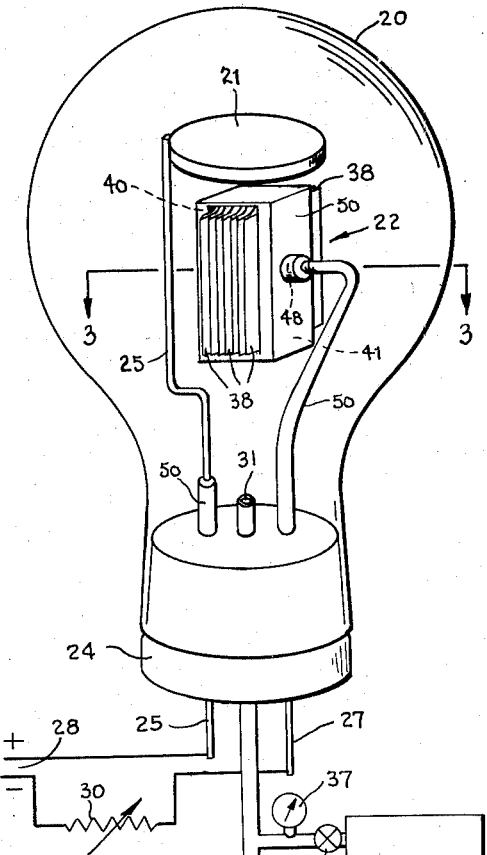
Figure 1 is a diagrammatic view of one type of apparatus which can be utilized in carrying out the invention.

Having reference now to Figure 1, wherein an elementary apparatus for carrying out the invention is diagrammatically illustrated, 20 is a glass envelope which encloses an anode electrode 21 and a cathode electrode generally indicated at 22, the envelope being adapted to contain a gaseous or vapor atmosphere for sustaining a gaseous discharge. Envelope 20 is provided with a rubber stopper 24 which forms therewith a gas-tight enclosure, and lead wires 25, 27 pierce the stopper in a gas-tight manner to respectively connect the anode and cathode to suitable external source of D. C. power 28 having a rheostat 30 or its equivalent in circuit therewith. A gas inlet and exhaust tube 31 also pierces the stopper in a gas-tight manner, the outer end of the tube being operably connected to external apparatus for admitting or evacuating gasses and vapors into or from the envelope. This apparatus includes a pump 32, gas and vapor tanks 34, shut-off valves 35, and a pressure gauge 37.

The cathode 22 includes a work piece holder or clamp which, in the illustrated embodiment, is adapted to support a plurality of double edged razor blades 38 so that the cutting edges thereof can be processed in accordance with the invention to make them harder, sharper and more durable. Before being mounted in the clamp, the blade edges are pre-formed by sharpening them in the conventional manner. The blades 38 are held in the clamp in such a way that their pre-sharpened edges only will be subjected to the positive ion bombardment of the gaseous discharge, the blades being arranged in side by side relation with the opposite cutting edges thereof lying in parallel planes. To this end, the clamp comprises a pair of end plates 40, 41, Figure 2, end plate 40 having an elongated alignment lug 42 which is passed through the central slots 44 in the blades to hold them in properly aligned position. The lug 42 is provided at its outer end with a bolt portion 45 which extends through a bore 47 in the plate 41 and is engaged by an elongated nut 48 which is tightened against the plate 41 to hold the blades in close engagement with one another. After the blades have been assembled in the clamp as above described, the opposite end of the nut 48 is threaded onto the upper end of the cathode lead 27 as indicated in Figure 1.

Figure 3:
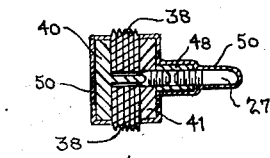
Figure 3 is a horizontal sectional view of the work piece clamp taken on line 3—3 of Figure 1.

The entire outer surface of the work piece clamp, the upper and lower ends of the blades 38 and the portion of the cathode lead wire 27 within the envelope are coated with electrical insulating material 50, Figures 1 and 3, so that only the cutting wedge areas of the blades are left uncovered and form a serrated surface which serves as the actual cathode electrode for the gaseous discharge. It is desirable to vapor deposit most of the infrangible material onto the blade edges or apexes in order to carry out the method in the most efficient manner, and this is accomplished during the vapor deposition step by maintaining the edge or apex temperature appreciably higher than the rest of the blade wedge surfaces. The side by side relationship of the blades in the clamp accentuates this action by exposing these edges to the most severe positive ion bombardment, and also because the edges offer less impedance to the gas convection currents. The side by side relation of the clamped blades also makes the internal heat conductivity of the group approach that of solid metal, and this feature enhances uniform edge temperatures for both the vapor deposition and sputtering steps. It also provides a heat leak for the blade group so that a steep temperature gradient is maintained from the high temperature apex to the root of the blade wedge.

Various materials can be used satisfactorily for the parts of the apparatus illustrated in Figures 1, 2 and 3. Iron or steel are preferred for the end plates 40, 41 and tightening nut 48 of the clamp, although nickel, copper, brass, etc. can also be used. Alternatively, the end plates and tightening nut can be made of ceramic material such as lava, alundum, magnesium oxide, and the like, which would eliminate the need for providing an insulation coating. However, in such case, provision must be made for an electrical connection between the blade group and cathode lead wire 27. Iron, steel, nickel, copper, etc. can be used for the anode 21 and for the lead wires 25, 27, while the exhaust tube 31 can be formed of glass, copper, iron or the like. The electrical insulating material 50 is preferably aluminum oxide, but other refractory insulating materials such as berylium oxide, magnesium oxide, etc. can also be used.

The method of the invention may be carried out with the above described apparatus in the manner outlined by the following illustrative example. In order to produce harder, keener abrading contours or cutting edges on a group of carbon steel razor blades, boron is employed as the deposited infrangible material. The blade edges are first pre-formed or sharpened in the usual manner, and are then secured in the work piece clamp as above described. In a clamp as shown, a group of approximately 15 blades, each having a thickness of approximately .0065 inches, can be treated at one time although production type apparatus could of course accommodate a much larger number of blades. Special care is taken to clamp the blades in a compact group so that there is no space between the flat blade sides or between the two outside blades and the end plates 40, 41. This precaution is taken to enhance the internal conductivity of the blade group. In addition, the end plates are formed of relatively thick cold rolled steel to further insure good internal heating conductivity in the blade group. Care is also taken to carefully align the blade edges so that they lie in two parallel planes, since this insures uniform positive ion bombardment of the edges.

After the blades 38 have been secured in the clamp, the end plates 40, 41, nut 48, and portion of the cathode lead wire 27 within the envelope are coated with aluminum oxide insulating material 50 as indicated in Figures 1 and 3. The lower portion of the anode lead wire 25 is also coated with aluminum oxide, but the remainder thereof is not. The gaseous discharge is thus confined to the uninsulated blade deges and uninsulated portion of the anode lead wire and anode disc 21 adjacent the blade edges. The insulating coating 50 may be applied by a series of alternate dippings and heatings of the parts in a water sodium silicate suspension of the insulating material and gas flames respectively. The parts are heated to approximately 250° C. in the gas flame after each dip to drive off moisture and bind the coating to the parts. A coating thickness of from 5 to 10 mils is in this manner built up in a series of layers. The uncoated ends of the blade group are preferably brush painted with the same water silicate insulating solution which is used for the dip coating. In this connection, it should be noted that in order to conserve positive ion bombardment energy, and also to improve the internal heating distribution, the outside edges of the end plates 40, 41 should be completely insulated but the insulation material should not extend beyond the flat sides of the two outside blades.

After the insulation material has been applied, the anode 21 and blade holding cathode 22 are mounted on the rubber stopper 24 and inserted in a Pyrex glass flask envelope 20 as shown in Figure 1. The envelope is evacuated to a few microns of pressure and filled with argon gas to a pressure of approximately 6 mm. of mercury. A gaseous discharge is then started to heat the electrodes, and particularly the blade edges, by positive ion bombardment. Although the envelope 20 and other parts of the apparatus would normally be heated and treated before assembly by well known vacuum technic methods to drive off moisture and other contaminents, additional amounts of gas and various vapors are usually released immediately upon heating the electrodes and associated parts by the gaseous discharge. This condition is indicated by a rapid increase in the total gas pressure, and in the normal cathode fall. Accordingly, a series of operation cycles consisting of repumping to a few microns of pressure and refilling to 6–8 mm. of argon gas may be carried out to rid the parts of contaminents as well as heating them to the proper vapor deposition temperature.

With the gaseous discharge operating at approximately 450 volts, 150 milliamperes, to heat the blade edges to slightly below a dull red temperature (about 550° C.), and with an argon gas pressure of approximately 6 mm., diborane gas ($B_2H_6$) is admitted into the envelope discharge chamber to start the vapor deposition step. The diborane gas increases the total gas pressure to approximately 8 mm., and it is necessary to increase the voltage to about 600 volts (100 milliamps. current) to keep the blade edge temperature at 550° C. After approximately ten minutes of gaseous discharge operation under the above conditions, during which boron ions are deposited on the blade edges, the envelope is repumped and refilled with approximately 5 mm. of argon and 5 mm. of diborane gas and the gaseous discharge is again operated for approximately ten minutes. A third gaseous discharge operation is then conducted for approximately fifteen minutes with a mixture of approximately 3 mm. of argon and 9 mm. of diborane gas, and with the blade edge temperature being maintained at approximately 550° C. At the conclusion of the second gaseous discharge operation, the bright metallic color of the blade edges normally changes to a pale tan color, and after the third, 15 minute operation, the color changes further to a pale grayish-brown which indicates that a surface reaction has occurred.

Following the vapor deposition step outlined above, the blade edges are sputtered by a gaseous discharge using the same apparatus, but with a pressure of 0.1 mm. of argon gas only. A sputtering voltage of approximately 950 volts with 12 milliamps. current is employed but the gas clean-up may make this voltage tend to increase with a constant input voltage setting of the supply voltage. The sputtering operation is continued for approximately 25 minutes, and during this period the argon gas is flushed out and refilled three times. The sputtering step does not appreciably change the grayish-brown coloration of the blades left by the vapor deposition step, but the normally white aluminum oxide insulation coating in the proximity of the blade edges is very much darkened by the sputtered material. After this step, however, scratch tests of the blade edges on carboloy material shows comparable hardness, and usage tests confirm the superior keenness and durability of the cutting edges.

The foregoing example is described in some detail for illustrative purposes only, and it will be apparent to those skilled in the art that the time of operation can be reduced by less contamination and better circulation of the reaction gas, by higher sputtering voltages, etc., as would be the case in large production type apparatus.

Figure 4:
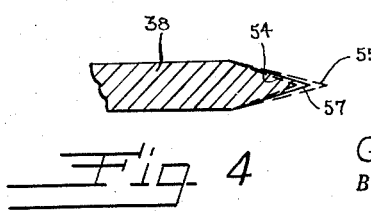
Figure 4 is a fragmentary sectional view on an enlarged scale illustrating the steps in the formation of an infrangible cutting edge on a bladed tool.

The enlarged sectional view of the razor blade shown in Figure 4 illustrates in a greatly exaggerated manner the way in which the above described steps affect a blade edge. In this figure, the inner dotted lines 54 indicate the original shape of the blade edge after being pre-formed by conventional sharpening methods. The outer dotted lines 55 indicate the shape of the blade edge after the vapor deposition step, the distance between the two sets of dotted lines indicating the build-up of the infrangible material deposited. The solid lines 57 indicate the final conformation of the blade edge after the sputtering step, and therefore also indicate how much of the deposited infrangible material is removed thereby. In actual practice, it has been found that a build-up of infrangible material to a thickness of approximately .00005 inch in the vicinity of the apex is adequate, approximately 25% of this thickness being removed during the sputtering step. As indicated in Figure 4, the vapor deposition step causes more infrangible material to be deposited at the apex of the blade wedge than on the remainder thereof. This extra thickness is, however, nullified by the sputtering step during which more material is removed from the vicinity of the apex than from the remainder of the blade wedge, the sputtering action resulting in a uniformly sharpened blade having an exceedingly keen edge. The combination of the relatively brittle infrangible material deposited on the more resilient carbon steel of the blades, moreover, results in superior strength and durability characteristics not attainable in ordinary blades produced in the conventional manner.

Figure 5:
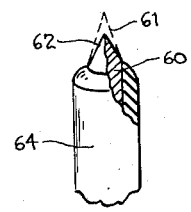
Figure 5 is a perspective view partly in section illustrating an insulating arrangement for carrying out the method of the invention on a style shaped article.

Reference is now made to Figure 5 wherein an arrangement is shown for the insulating material for forming a sharp point of hard material on a metal stylus type of article. The method and apparatus for forming the durable point of infrangible material are substantially the same as those described above for razor blades except for adapting them to the different type of article. The stylus body 60 is used for the cathode electrode for the gaseous discharge in the vapor deposition and sputtering steps as in the previous example. The article is pre-formed by sharpening it to approximately the desired contour and dimensions, since it is more economical to do the preliminary rough forming by mechanical methods. The dotted lines 61 illustrate in a somewhat exaggerated manner the contour of the point after the vapor deposition step but before the erosion of a portion of the deposited material by the sputtering step. The final point contour after the sputtering step is shown by the solid lines 62. As indicated in the drawing, the sputtering step removes material from the entire actuation area of the stylus, but removes more from the apex area of the cone than from the base of the cone. The drawing also illustrates how the sputtering action discriminately removes the infrangible material to make the surface of the cone concave or "undercut".

The insulating material 64 illustrated in Figure 5 is shown as adhering or being "bound" to the stylus body 60. However, it has been found that binding the insulation material to the work piece is not essential. In fact, it is sometimes advantageous to pack loose powdered insulation material around the metal cathode body as, for example, when it is desired to uniformly process a large group of stylus type articles. In such cases, a plurality of articles can be clamped side by side and surrounded by the loose insulation material so that their apexes form a hob surface in a common plane above the material.

Figure 6:
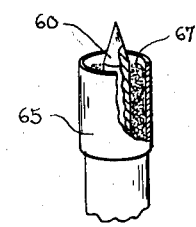
Figure 6 is a perspective view partly in section of a modified insulating arrangement for the article shown in Figure 5.

Figure 6 illustrates an arrangement for a combination of insulation material and metal shielding for treating a stylus article as illustrated in Figure 5. The metal sleeve 65 may be held in place by clamping it to the insulating material 67, by supporting it separately from the envelope or, when used with loose insulating material, by inserting one end of the sleeve into the loose material. It is not necessary for the shielding sleeve to be connected in the electrical circuit for the gaseous discharge since it apparently assumes a static voltage charge, which prevents positive ion bombardment of the stylus body within the sleeve. The metal shielding sleeve 65 can be made of iron, nickel, molybdenum, or like material. The material thickness of the sleeve is not critical, although it is preferable to use material in the range of 0.002 to 0.010 inch thick, which is a compromise on strength, ease of degassification, cost, etc.

The spacing between the inside of the metal sleeve 65 and outside of the stylus body 60 is preferably appreciably less than the mean free path dimensions of any gas or vapor which participate in the gaseous discharge action of the vapor deposition and sputtering steps. A limitation on the closeness of the shield to the stylus body is that material sputtered from the cone face may form conductive stalagmites between the shield and the stylus body thus nullifying the shielding. As a general rule, spacings less than 10 mils are susceptible to this problem.

Figure 7:
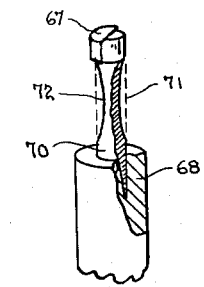
Figures 7 and 8 are perspective views partly in section illustrating an insulating arrangement for carrying out the method of the invention on the abrading contour portions of different types of machine tools.

Figure 7 illustrates the positioning of insulating material 67 and 68 for sputtering a cylindrical rod 70 to an "hour glass" type of contour. The dotted lines 71 show the cylindrical cathode 70 before, and the solid lines 72 after, the sputtering step, and therefore show tendency of the sputtering erosion to "under cut" the insulation. Placement of a pellet of insulating material 67 on the end of the cylindrical cathode rod 70 seems to reduce the sputtering in the proximity of the insulation 67 due to the fact that the insulating material assumes a static charge which repels further positive ion bombardment.

Figure 8:
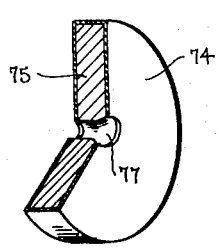

Figure 8 shows the placement of insulating material 74 on a metal washer disc 75 which is to be used as a wire guide. In this guide, the venturi shaped central opening 77 is to be lined with infrangible material to reduce wear. The disc 75 is completely covered with insulating material 74 except for the side wall of the pre-formed opening 77 which is left bare to serve as the cathode electrode for the gaseous discharge.

Figure 9:
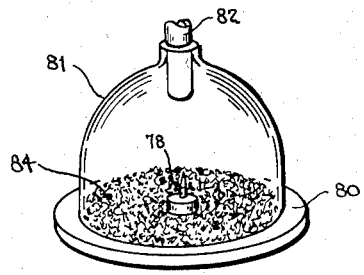
Figure 9 is a perspective view illustrating an insulating arrangement for carrying out the method of the invention on a small integral portion of a relatively large article.

Figure 9 shows a slightly modified arrangement for producing an abrasion or wear resistant surface on a stylus or trunnion 78 which is fixed to and serves as a bearing for a relatively large metal disc 80. In this arrangement, the disc 80 forms the bottom closure for a funnel shaped non-conducting envelope 81 which may be of some material such as glass or rubber. The trunnion 78 and disc 80 also act as the cathode electrode for the gaseous discharge. A metal tube 82 is used for the anode electrode and also serves as the exhaust tube for evacuating and filling the gaseous discharge chamber formed by the disc and envelope 81. The insulating material 84 overlies and insulates the surface of the disc 80, and exposes only the trunnion 78 to the positive ion bombardment. This material may be bound to the disc surface, or it may be loose powdered material spread over the disc surface engulfing all except the trunnion to be hardened.

Figure 10:
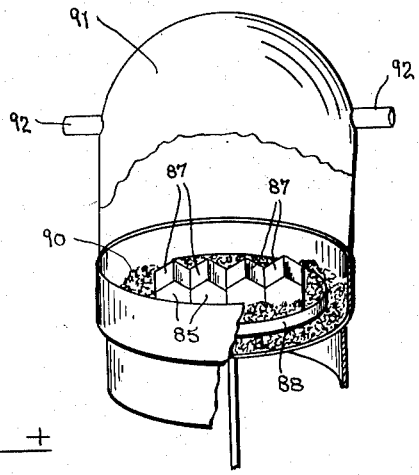
Figure 10 is a perspective view partly in section illustrating an arrangement for carrying out the method of the invention on tool inserts and also showing an arrangement of loosely stacked insulating material.

An arrangement for processing side-tool cutting blades is shown in Figure 10 which illustrates the manner in which a plurality of wide wedge cutting edges may be mounted to expose the actuation areas thereof to the positive ion bombardment. The cutting blades 85 are arranged in side by side relation so that the wide wedge cutting edges 87 thereof form a serrated surface similar to that of the razor blade group shown in Figure 1. The side by side arrangement of the blades 85 also improves the internal heat conductivity as in the case of the razor blades. As shown in Figure 10, the blades 85 contact a metal disc 88 to make electrical contact for a cathode, and are surrounded by powdered insulating material 90 to expose only their wedge shaped cutting edges to the vapor deposition and sputtering. A metal envelope 91 is used for the anode electrode, and the lower portion of this envelope holds the loose insulating material in place. Two exhaust tubes 92 are provided to increase the circulation of reacting gas during the vapor deposition step.

Figure 11:
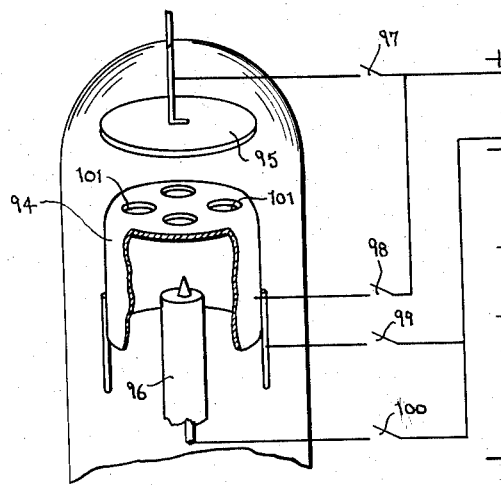
Figure 11 is a diagrammatic view of a modified electrode arrangement.

Figure 11 shows an arrangement of apparatus having an auxiliary electrode 94 in addition to the anode 95 and work piece cathode 96. By various combinations of opening and closing the electrical switches 97, 98, 99 and 100, as shown diagrammatically, a flexible arrangement is provided whereby the auxiliary electrode can be used singly or in combination with the other electrodes.

as an anode or a cathode, or as an electrically floating electrode. The auxiliary electrode 94 partially encloses the cathode 96 in order to conserve heat by reducing gas convection currents and also by reflecting the heat produced at the cathode actuation area back on itself. In certain instances it is difficult to start or to sustain the gaseous discharge because the cold resistance of the actuation area of the work piece is extremely high. In a case of this kind, the actuation area may be heated by heat radiated from the auxiliary electrode 94, the latter being used as a cathode and heated by positive ion bombardment. If the resistance of the actuation area remains high upon heating, the entire vapor deposition operation may be carried out by radiation heating from the auxiliary electrode. If, however, the resistance of the actuation area decreases upon heating, the positive ion bombardment may be switched from the auxiliary electrode 94 directly to the actuation area by means of the electrical switches 99 and 100. This method of starting the gaseous discharge when the electrical resistance of the actuation area is initially high but decreases upon heating may be used for both the vapor deposition and sputtering steps. The auxiliary electrode has a plurality of perforations 101 to facilitate positive ion bombardment of the actuation area, and also to facilitate switching from the auxiliary electrode to the work piece electrode 96 for the cathode.

Figures 12–17 illustrate diagrammatically a number of anode and work piece cathode arrangements which may be advantageously used for gaseous discharge processing as described herein. They also indicate how in some instances the apparatus may be simplified by having the electrode form all or a part of the envelope. In these diagrams the envelope is indicated at 105, the work piece holding cathode at 107, the anode at 108 and the auxiliary electrode in Figure 15 at 110. In apparatus wherein an electrode is a part of the envelope, the drawings show the envelope intersecting the electrode, as for example in Figure 13 for the anode and Figure 14 for the cathode.

Figures 12, 13:
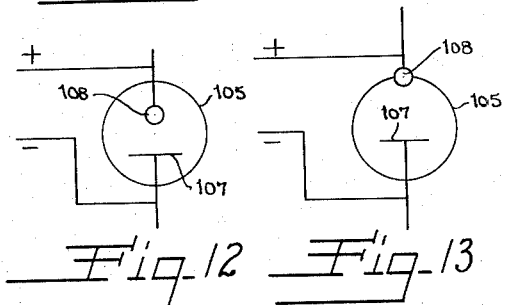
Figures 12–17 are schematic diagrams of various additional electrode arrangements.
Figures 14, 15, 16:
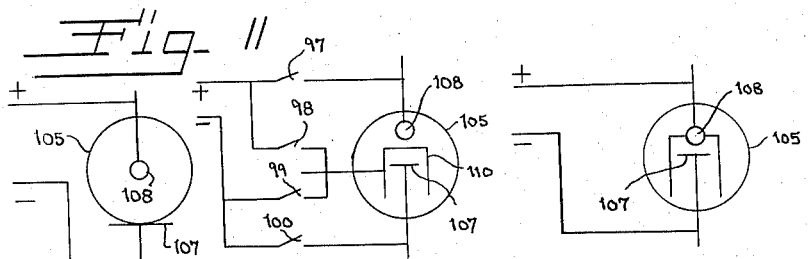
Figure 17:
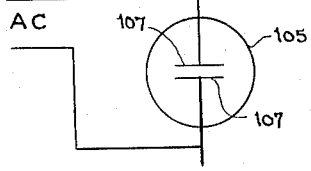

Figure 12 shows an arrangement for the anode and cathode corresponding to the electrode arrangement of Figure 1, described above. Figures 13 and 14 show arrangements corresponding to the electrode arrangements of Figures 10 and 9, respectively. Figure 15 includes an auxiliary electrode 110 as described above in connection with Figure 11 and includes the switches 97, 98, 99 and 100 which make it possible to use the auxiliary electrode in a flexible manner, alone or in combination, as an anode or as a cathode. The electrode arrangement of Figure 16 is not shown by other figures above but is a special case of Figure 15 wherein the switches 97, 98 and 100 are closed to make the auxiliary electrode an anode. The structure illustrated by Figure 16 is especially useful in reducing heat losses from gaseous convection currents and from cathode electrode radiation. It is also useful for high resistance cathodes, either for preliminary heating of the cathode to initiate the gaseous discharge or for complete heating during the vapor deposition step as described above in connection with Figure 11. Figure 17 shows an arrangement having a pair of work piece holding electrodes 107 for use with an A. C. voltage supply in which case each electrode alternately serves as an anode and cathode for its opposite electrode in accordance with the alternations in the A. C. voltage.

*Vapor deposition*

The coating of metals and other materials by vapor depositions is well known metallurgical practice, and no claim is made to this step per se of the method disclosed herein. However, the following factors are of major importance in carrying out the vapor deposition step in the present method, and should be discussed briefly.

(1) The material of the work piece.

(2) The temperature of the underbody.

(3) The pressure or concentration of the reaction gas or vapor.

(4) The type of reaction gas or vapor atmosphere.

(5) The edge effects, i. e., the tendency of the coating layer to deposit more rapidly on edges and points.

It is known that a wide variety of materials can be used for the work piece or underbody, and for the deposited infrangible material. However, economic considerations, especially the cost of pre-forming the work piece, impose limitations. Materials such as iron, steel, nickel and other alloys have been found to be preferable for the work piece or underbody material because economical and dependable pre-forming methods on a mass production scale are available. Borides, carbides, nitrides, etc. have been found to be most suitable for the infrangible material. The term infrangible material as used herein should be understood to refer to deposited materials having a hardness of the order or magnitude of quartz or greater, i. e., their hardness on Mohs' scale is 8 or greater.

The optimum underbody or work piece temperature for a high rate of infrangible material deposition is determined primarily by the underbody material and the identity of the reaction gas or vapor. The underbody temperature also influences the adherence of the coating to the underbody and the grain size of the coating. In most cases, it has been found that with the temperature kept constantly at its optimum value, the deposition rate of infrangible material increases with the pressure or concentration of the reaction gas or vapor up to and beyond the range of total pressures that give stable glow discharge operation. If higher pressures are used the gaseous discharge is more likely to become unstable and will have a tendency to change over into an arc discharge with its resultant deleterious hot spot heating of the underbody. The maximum total pressure for stable operation varies somewhat, but generally is of the order of 100 mm. of mercury.

The term "reaction gas" or "reaction vapor" as used herein refers, of course, to the gas or vapor which reacts with the work piece actuation area to deposit the infrangible material. Thus, the diborane gas was the reaction gas from which boron was deposited on the razor blade edges in the illustrative example cited hereinabove. In most cases, it is preferable to use a carrier gas to supplement the reaction gas or vapor since the carrier gas makes it possible to obtain better voltage-current discharge conditions for heating the work piece. In the razor blade example, the argon gas was a carrier for the diborane gas. The carrier gas is especially beneficial when a reacting vapor is used, for without the carrier gas the total pressure would depend upon the vapor pressure only, which means that the pressure would be determined by the coolest area of the envelope. The toxicity and other hazards of many of the reacting gases and vapors are also lessened by the admixture of inert gases such as argon, neon, krypton, etc.

Occasionally the optimum deposition temperature of the underbody exceeds or is of the same order or magnitude as the temperature at which excessive thermionic emission makes the gaseous discharge inoperable, i. e., the "glow" discharge changes over to an arc discharge. However, it has been found that if the vapor deposition operation is started at a low underbody temperature so that the low thermionic emission makes a glow discharge possible, a low emissive coating layer can first be deposited. The underbody temperature can then be increased to a more optimum range for subsequent vapor deposition.

*Sputtering*

The primary purpose of the sputtering step is to erode the deposited coating of infrangible material in a manner that produces a sharp cutting edge or abrading contour.

A measure of the efficacy of the operation is the rapid erosion of the material from the dominant portions of the actuation area.

Some of the major factors which influence the sputtering action are as follows:

(1) The material of the cathode surface, (i. e., the infrangible material deposited by the vapor deposition step).

(2) The gas or vapor used for sputtering.

(3) The bombardment energy (especially the magnitude of the bombardment voltage).

(4) The gas or vapor pressure.

(5) The shape, spacing and arrangement of the cathode and insulation.

For the sputtering step it is preferable to use one or more of the monatomic inert gases such as argon, neon, helium or krypton because their nonreacting chemical properties simplify control of the sputtering operation and they are less subject to gas clean-up by the gaseous discharge. However, gases such as carbon dioxide, hydrogen, nitrogen or mercury vapor can also be used, although they generally require closer control of the temperature to avoid chemical reactions and, in the case of mercury vapor, closer control of the pressure.

It is advantageous to use low gas or vapor pressures as the amount of material sputtered in a unit of time varies inversely with the pressure. The pressure also determines the minimum gaseous discharge voltage (for normal cathode fall) and is a factor in the voltage-current ratio under abnormal cathode fall conditions of sputtering. Extremely low pressures (0.1 mm. and below), make it possible to use high sputtering voltages (1000 volts and above), but they are hazardous and expensive. The cost of the apparatus and auxiliary circuits for high voltage operation places a limit on the use of extremely low gas or vapor pressures for sputtering. Gas clean-up by gaseous discharge is very rapid at low pressures and requires provision for frequent replenishment. An example of value ranges which have proved satisfactory in connection with the foregoing area, a total gas or vapor pressure of from 0.0001 to 1.0 mm. of mercury, and a sputtering voltage of from 1000 to 5000 volts. Under these operating conditions and with most cathode surfaces, a rough figure of 10 milligrams per milliampere hour can be used in estimating the amount of material removed by sputtering.

Insulation

The purpose of the insulating material is, of course, to confine the positive ion bombardment to the actuation area. The insulating materail should be capable of withstanding high temperature (from room temperature to 1500° C.) without reacting with the underbody material or the reaction gas, and without giving off appreciable quantities of deleterious gases or vapors. In addition, the material must maintain its electrical insulating properties without disintegrating under positive ion bombardment. The insulation coating should be a contiguous covering for all parts of the underbody or work piece except the actuation area so that the positive ion bombardment will be confined to the desired area and deleterious heating of other areas will be prevented.

It has been found that refractory insulating materials such as aluminum oxide, magnesium oxide, and beryllium oxide fulfill the chemical and physical requirements above noted. Commercial grades of aluminum oxide, known as Norton's 38-500 or 38-900, give especially satisfactory results when properly applied. A 5–10 mil thick coating of either of these materials will withstand gaseous discharge voltages up to several thousand volts.

Electrodes

The primary function of the cathode electrode is to support work pieces such as blades, styles, tool blanks, etc., individually or in a group. While in some instances it might be desirable to unload the work pieces after the vapor deposition step and rearrange them before proceeding with the sputtering step, this is usually unnecessary. Instead, it is only necessary to manipulate the valves and controls external to the gaseous discharge envelope to change the gas and regulate the pressures and voltage.

The principal requirement of the cathode for the vapor deposition step to hold the work pieces in such a way that the actuation area can be heated by a gaseous discharge positive ion bombardment, and is heated uniformly to avoid hot spot thermionic emission. The principal requirement of the cathode for the sputtering step is to hold the work pieces so that discriminate bombardment of the actuation area to produce the final abrading contour is facilitated, and that the actuation area is cooled in the proper manner to permit intense positive ion bombardment without hot spot thermionic emission.

The vapor deposition step works best with good internal heat conduction within the work piece group, but poor conduction for the group as a whole. The sputtering step works best with good internal heat conduction within the work piece group and also good conduction for the group as a whole. These partly contrarious requirements are compromised by generally favoring the sputtering step in the cathode design and arrangement of the parts because this step is normally more critical than the vapor deposition step in avoiding an arc discharge.

Some underbody materials and also vapor deposited materials are poor electrical conductors at ordinary temperatures, but at elevated temperatures their electrical conductivity is greatly increased. It is necessary therefore to heat them in a preliminary manner to a temperature at which their electrical conductivity is appreciable in order to use them for electrodes. An effective way to do this in both the vapor deposition and sputtering steps is to heat an auxiliary electrode 94, as shown in Figure 11, which then heats the actuation area to the necessary temperature by radiation. In the gaseous discharge as described herein, the heat generated at the cathode is many hundreds of times that generated at the anode, which makes it possible to readily heat the actuation area by heat radiated from the auxiliary electrode.

The anode electrode is much less critical than the cathode, and its area can be much less because of the smaller amount of heat developed at its surface. However, it is preferable to use an excess of anode area by having its surface area about equal to that of the actuation area of the work piece. The anode material can be iron, nickel, steel, copper or any of the other materials commonly used in the art.

Envelope

The primary requirements of the envelope are to maintain a gas-tight atmosphere for the gaseous discharge, and to operably support the electrodes. The envelope material may be of ceramic or metallic materials or combinations thereof. Metallic materials such as iron, chrome-iron, copper, etc. have the advantage that the envelope itself may be used as an electrode for the gaseous discharge, and that its temperature may be readily controlled externally for regulation of vapor pressures. A ceramic material such as glass makes it possible to observe gaseous discharge which may be helpful in determining pressures, voltages, and other gaseous discharge conditions for optimum results in both the vapor deposition and sputtering steps.

From the foregoing description it will be apparent that the invention disclosed herein provides a novel and highly useful method and apparatus for producing improved abrading contours on cutting tools and wear resistant machine parts. The invention may be embodied in other specific forms without departing from the spirit or essential characteristics thereof. The embodiments

What is claimed is:

1. A method for producing an improved abrading contour on cutting tools and wear resistant machine parts comprising the steps of heating the actuation areas of the tools and parts by means of a gaseous discharge in a reaction gas to coat the actuation areas with infrangible material, the actuation area of each tool and part being the cathode electrode for the gaseous discharge, and sputtering off a portion of the coating material on the actuation area by means of a gaseous discharge in an inert gas to shape the coating material to the desired contour.

2. A method for producing an improved abrading contour on a cutting tool comprising the steps of pre-heating the actuation area of the tool by means of a positive ion bombardment of a gaseous discharge, said actuation area serving as the cathode electrode for such discharge, heating said cathode actuation area in a reaction gas by means of a positive bombardment of a gaseous discharge to vapor deposit an adhering infrangible coating on the area, and sputtering said area in an inert gas by means of a positive ion bombardment of a gaseous discharge to shape said infrangible coating to obtain the desired final contour.

3. A method for producing an improved abrading contour on a wear resistant machine part comprising the steps of applying electrical insulation to said machine part except for the wear surface thereof, vapor depositing an infrangible material on said uninsulated wear surface in a gaseous discharge, said surface serving as an electrode for such discharge, and sputtering off a portion of the deposited material by means of a positive ion bombardment of a gaseous discharge to obtain the final abrading contour.

4. A method for producing an improved abrading contour on a cutting tool comprising the steps of pre-forming the cutting edge of the tool to substantially the desired contour, applying electrical insulation to said tool with the exception of said cutting edge, vapor depositing an infrangible material on said edge in a gaseous discharge, said edge serving as an electrode for such discharge, and removing a portion of the deposited material by a positive ion bombardment of a gaseous discharge to obtain the final desired contour.

5. A method for producing an improved abrading contour on a metal tool comprising the steps of pre-forming the portion of the tool to be treated by mechanical means to obtain the aproximate desired contour, electrically insulating said tool with the exception of said pre-formed portion, pre-heating said portion by means of a positive ion bombardment of a gaseous discharge, said portion serving as the cathode electrode for such discharge, heating said portion in a reaction gas by means of a positive ion bombardment of a gaseous discharge to vapor deposit an infrangible material thereon, said infrangible material being in the range of 8–10 on Mohs' scale, and sputtering said portion in an inert gas by means of a positive ion bombardment of a gaseous discharge to shape said infrangible material to the final desired contour.

6. A method for producing an improved abrading contour on a metal tool comprising the steps of mounting the tool as the cathode electrode in a gas-tight enclosure having an anode electrode therein, heating said cathode electrode by means of a positive ion bombardment of a gaseous discharge in a reaction gas and inert carrier gas mixture to a vapor deposit an infrangible material thereon, said infrangible material being in the range of 8–10 on Mohs' scale, the positive ions for said bombardment being supplied by said carrier gas and said deposited material being supplied by said reaction gas, and sputtering said deposited material in an inert gas by means of a positive ion bombardment of a gaseous discharge to erode a portion thereof to obtain the final contour.

7. A method for producing an improved abrading contour on a metal tool comprising the steps of heating the actuation area of the tool to slightly below dull red temperature by means of a gaseous discharge of a monatomic inert gas in a reaction gas to coat said actuation area with infrangible material in the range of 8–10 on Mohs' scale supplied by said reaction gas, said actuation area serving as the cathode electrode for such discharge, and sputtering the actuation area by means of a positive bombardment of a gaseous discharge in a monatomic inert gas to shape the coated mineral to the desired contour, said sputtering step being carried out at a higher voltage and lower gas pressure than in said vapor deposition step.

8. A method of producing an improved abrading contour on a metal tool comprising the steps of pre-forming the portion of the tool to be treated by mechanical means to obtain the approximate desired contour, electrically insulating said tool with the exception of said portion to be treated, pre-heating said portion to approximately 550° C. by means of a positive ion bombardment of a gaseous discharge in a monatomic inert gas, said uninsulated portion serving as the cathode electrode for such discharge, vapor depositing an infrangible material in the range of 8–19 on Mohs' scale on said portion by means of a positive ion bombardment of a gaseous discharge in a reaction gas and monatomic inert carrier gas mixture, the positive ions for said bombardment being supplied by said carrier gas and said deposited material being supplied by said reaction gas, and sputtering off a portion of said deposited material by means of a positive ion bombardment of a gaseous discharge in a monatomic inert gas to shape the deposited material to the final desired contour, said sputtering step being carried out at a higher voltage and lower gas pressure than in said vapor deposition step.

References Cited in the file of this patent

UNITED STATES PATENTS

| | | |
|---|---|---|
| 2,451,877 | Samuelson | Oct. 19, 1948 |
| 2,456,795 | Samuelson | Dec. 21, 1948 |
| 2,458,655 | Sowa | Jan. 17, 1949 |
| 2,476,592 | Fruth | July 19, 1949 |
| 2,505,370 | Sykes | Apr. 25, 1950 |
| 2,528,454 | Schlesinger et al. | Oct. 31, 1950 |
| 2,702,274 | Law | Feb. 15, 1955 |

FOREIGN PATENTS

| | | |
|---|---|---|
| 15,599 | Netherlands | Dec. 15, 1926 |

UNITED STATES PATENT OFFICE

CERTIFICATE OF CORRECTION

Patent No. 2,843,542                                           July 15, 1958

George F. Callahan

It is hereby certified that error appears in the printed specification of the above numbered patent requiring correction and that the said Letters Patent should read as corrected below.

Column 14, line 6, before "vapor" strike out "a"; line 24, for "mineral" read -- material --; line 37, for "8-19" read -- 8-10 --.

Signed and sealed this 11th day of November 1958.

(SEAL)

Attest:

KARL H. AXLINE
Attesting Officer

ROBERT C. WATSON
Commissioner of Patents